Sept. 30, 1958 H. L. BROWN 2,854,665
DUPLEX RADIO COMMUNICATION SYSTEMS
Filed Oct. 25, 1956
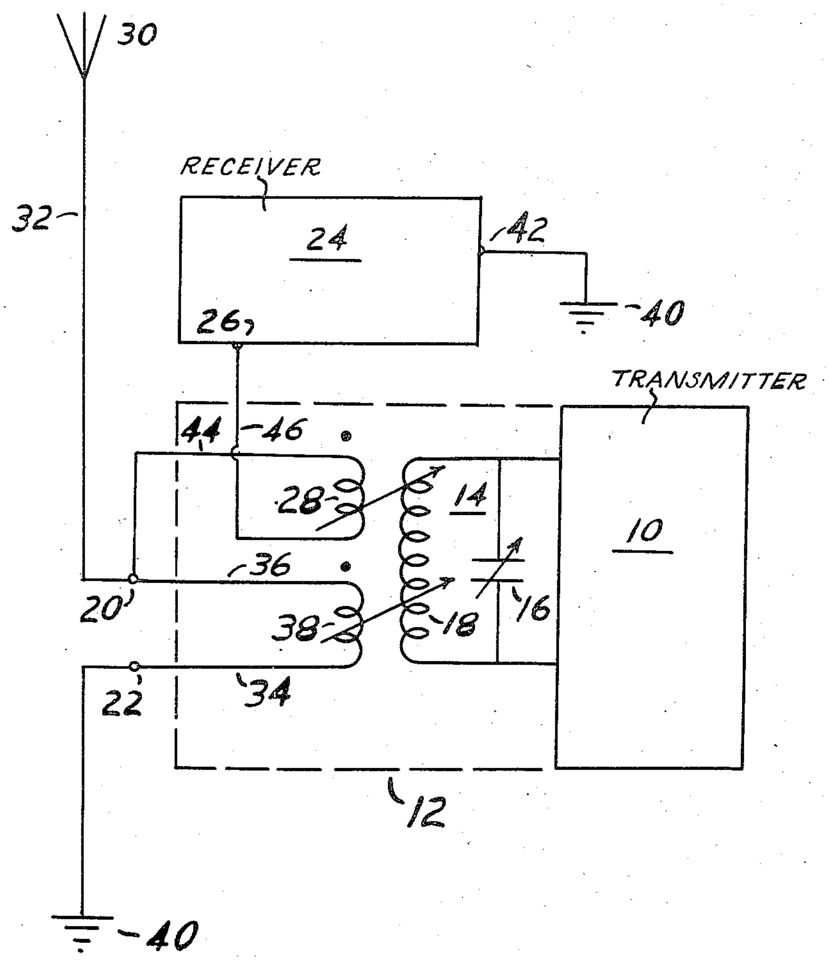
HENRY L. BROWN
INVENTOR.
BY
Wilkinson, Mawhinney & Theibault
ATTYS.

2,854,665
Patented Sept. 30, 1958

2,854,665

DUPLEX RADIO COMMUNICATION SYSTEMS

Henry L. Brown, El Paso, Tex.

Application October 25, 1956, Serial No. 618,204
5 Claims. (Cl. 343—180)

This invention relates to duplex radio communication systems and especially to station circuits for elimination of local transmitter signals at the local receiver.

In two-way radio communication systems having a radio transmitter and a radio receiver at each of two stations, it is quite often desirable to maintain simultaneous transmission of signals in both directions after the manner of telephone conversation. Such operation is termed "duplex operation." Ordinarily such operation is possible only if the transmitter and receiver at each station are well shielded and are connected to separate antennas and then only if the local transmitter and receiver employ widely separated frequencies; otherwise, blocking and feedback oscillation will result at the local receiver. Simultaneous two-way radio communication on common or close frequency channels may be simulated by utilizing a voice operated relay at each station. This relay energizes the local transmitter and de-energizes the local receiver each time sounds are spoken into the transmitter microphone, leaving the receiver in a normally-on condition at all other times in order that the distant message may be received. This voice operated relay system is complex and costly and of course necessitates frequent energization and de-energization of equipment.

Hybrid transformers such as are used in telephone repeaters may be employed in duplex radio systems to prevent local transmitter energy from reaching the local receiver but such arrangements are complex, expensive, and often require balancing with dummy loads, wasteful of power. Also, the close coupling often required of hybrid transformer windings is not always practical in radio frequency circuits which handle reasonable amounts of output power.

Therefore, it is an object of this invention to provide an improved system of two-way radio communication eliminating the necessity of transmitter receiver change over relaying.

It is another object of this invention to provide an improved duplex radio communication system wherein channels of communication in both directions may employ identical or nearby radio frequencies.

It is a further object of this invention to provide an improved circuit for a station of a duplex radio communications system whereby interference in the local receiver caused by the local transmitter may simply and economically be eliminated.

It is a further object of this invention to provide an improved circuit for a station of a duplex radio communications system wherein both transmitter and receiver employ the same antenna.

The invention may be described briefly as a circuit for connecting a transmitter and a receiver to the same antenna although the transmitter and receiver may be operating simultaneously even upon the same radio frequency. The circuit neutralizes the local transmitter signal insofar as the local receiver is concerned by coupling an additional link or coil to the transmitter final tank circuit and serially connecting this additional link in the receiver line to the common antenna. The polarity of the connection of the additional link is opposite to the transmitter's output to the common antenna derived from a similar link. Hence the connection of the additional link has the effect of bucking the local transmitter's signal at the local receiver.

The invention will be described with reference to the accompanying circuit diagram wherein a station of a duplex radio communications system is represented.

Radio transmitter 10 has an output portion 12, comprising a final output tank circuit 14, and antenna system output terminals 20 and 22. The final tank circuit is resonant at the operating frequency of the transmitter and comprises the parallel combination of capacitor 16, and final tank coil 18. An antenna 30 is connected to output terminal 20, by means of lead in transmission line 32. Output terminal 22 is connected to common ground or earth 40. Antenna 30 and ground 40 comprise the antenna system for the station. Output link coil 38, is inductively coupled to final tank coil 18 and couples radio frequency energy to the antenna system through conductors 34 and 36 and output terminals 20 and 22. Output link 38 is adjustable with respect to tank coil 18 to accomplish conventional antenna loading and other adjustments.

Link 38 can be supported at the circumference thereof by a rotatable shaft suitably insulated from link 38 to form a conventional swinging link. Link coil 28 is similar to link coil 38 except that it is physically far enough away from link coil 38 so that objectionable inductive coupling between links 38 and 28 is kept to a minimum. Link 28 is inductively coupled to final tank coil 18 and is physically adjustable with respect thereto in a manner similar to link 38. Thus the electromagnetic inductive coupling between link 28 and tank coil 18 may be varied at will. The dots at the upper ends of links 28 and 38 in the diagram indicate that these points have an in-phase relationship. That is, when a voltage is induced by tank coil 18 in link 38, positive in potential sense at the dotted end with respect to the undotted end (in other words with respect to ground), then at the same time a voltage having the same potential sense will appear at the dotted terminal of link coil 28, with respect to the undotted terminal. In other words, links 28 and 38 are wound in the same direction and are physically related to tank coil 18, as shown in the diagram. When a positive voltage appears at the dotted terminal of link 38, a positive voltage will also appear at the dotted terminal of link 28, due to the same electromagnetic induction from tank coil 18. Link 28 has physical dimensions similar to link 38, so that link 28 may be adjusted to have induced in it the same voltage as link 38. Two like terminal ends, i. e., the dotted terminal ends, of links 28 and 38 are connected together through conductor 44 conveniently connected to the transmitter antenna output terminal 20. Station receiver 24, employs an antenna input terminal 26 connected to the remaining end of link coil 28 through conductor 46. It is seen that receiver 24 may derive input from antenna 30 through link 28. The ground terminal 42 of receiver 24 is returned to the common ground or earth 40. Receiver 24 should be shielded so that it will not pick up stray radiation.

Link 38 is designed to match the impedance of the antenna system. Alternatively, an impedance transforming system may be inserted in leads 34 and 36. Components 16 and 18 forming the tank circuit are chosen according to good engineering practice to match the impedance of the final stage of the transmitter to that of link 38 while also maintaining a reasonably high "Q." Link 28 is designed to have an impedance on the same order as link 38 so that identical voltages may be induced in both links 28 and 38 by tank coil 18. Although a Marconi antenna system is shown in this illustrated embodiment of the invention, it is understood that other antenna systems may be used with this invention or circuits employing this invention in plurality. Likewise a more complex tank circuit employing for example a split-stator capacitor might also be used without departing from the invention.

In describing the operation of the invention it is assumed that both transmitter 10 and receiver 24 are energized and operating and that they are tuned to the same radio frequency or to frequencies close enough to cause blocking or feedback problems in the ordinary communications station. Circulating resonant current flows in tank circuit 14 through tank coil 18 as in the usual radio transmitter. Tank coil 18 forms the primary coil of a radio frequency transformer, while link coils 28 and 38 are arranged to form secondaries of the same radio frequency transformer. Therefore links 28 and 38 have induced in them in-phase voltages. The relative proximity of links 28 and 38 to tank coil 18 is physically adjusted so that the voltage existing across link 28 is substantially the same as that across link 38. Link 38 feeds the antenna system composed of antenna 30, lead in 32 and ground connection 40 while link 28 is serially connected from the same antenna lead in to receiver input terminal 26. But the lead 44 connected to the top dotted end of link 28 is connected to the antenna lead in while the remaining lead 46 feeds the receiver. If the dotted end of link 38 is taken to be positive in potential, the dotted end of link 28 will also be positive with the remaining end relatively negative as previously explained. It is seen that insofar as the receiver is concerned, link 28 is connected to subtract or buck the voltage added to the antenna by transmitter output link 38. If link 28 is properly adjusted with its induced voltage equal to that of link 38, then none of the transmitter output voltage fed to the antenna via link 38 will appear at the receiver. Distant radio signals picked up by the antenna will not be cancelled, however. In this connection the mutual coupling between links 28 and 38 should be kept to a minimum by physical separation or proper shielding so that a distant signal received by the antenna will not also be cancelled by transformer action. In practice the physical adjustment of links 28 and 38 relative to tank coil 18 is accomplished during operation for maximum cancellation of the local transmitter signal at the local receiver.

What is claimed is:

1. In a duplex radio communications systems, a local transmitter having a final tank coil, an antenna output terminal, a ground connection, a first secondary winding inductively related to said tank coil and serially connected between said antenna output terminal and said ground connection in a first polarity sense, and a second secondary winding inductively related to said tank coil, an antenna input terminal for a local receiver, and means connecting said second secondary winding serially between said antenna output terminal and said antenna input terminal in a second polarity sense opposite to said first polarity sense, whereby the local transmitter and a local receiver may be simultaneously operated without the local transmitter signal apeparing in the local receiver.

2. A radio system comprising a transmitter having a final tank coil and a pair of output terminals, a point of common reference potential connected to the first of said output terminals, a first secondary winding inductively related to said tank coil and connected serially between the first and second of said output terminals in a first polarity sense, said first secondary winding being physically adjustable with respect to said tank coil, a second secondary winding inductively related to said tank coil and physically adjustable with respect thereto, a receiver having a pair of input terminals, the first of said input terminals being connected to said point of common reference potential, and means serially connecting said second secondary winding between the second of said output terminals and the second of said input terminals in a polarity sense opposite said first polarity sense, whereby a common antenna may be connected to the second of said output terminals for purposes of simultaneous transmission and reception of radio signals.

3. A radio system comprising a transmitter including an output tank circuit, said tank circuit comprising the parallel resonant combination of a capacitor and a tank coil, a common ground connection, a transmitter output terminal for connecting to an antenna, a first secondary winding inductively coupled to said tank coil and serially interconnected from said common ground connection to said transmitter output terminal in a first polarity sense with respect to said common ground connection, a receiver having an input terminal, a second secondary winding inductively coupled to said tank coil and serially interconnected from said transmitter output terminal to said input terminal of said receiver in a second polarity sense with respect to said common ground connection opposite to said first polarity sense, and means for adjusting the coupling between said first secondary winding and said tank coil and between said second secondary winding and said tank coil, whereby a signal produced by said transmitter may be balanced out of said receiver.

4. A radio system comprising an antenna, a ground connection, a transmitter operating at a given radio frequency having an output tank circuit comprising the parallel combination of a capacitor and a tank coil, said tank circuit being resonant to said given radio frequency, a first output link coupled to said tank coil and receiving induced voltages therefrom, said link being serially interconnected from said ground to said antenna in a first polarity sense of said induced voltage with respect to ground, said link being physically adjustable with respect to said tank coil, a receiver tuned to the same given radio frequency and having antenna and ground terminals, a second output link coupled to said tank coil and receiving induced voltages therefrom but relatively uncoupled from said first output link, said second output link being serially interconnected from said antenna to said antenna connection of said receiver in a second polarity sense of said induced voltage with respect to ground opposite to said first polarity sense, said second output link being physically adjustable with respect to said tank coil, whereby a signal produced by said transmitter may be balanced out of said receiver by adjustment of said output links.

5. A radio communication system comprising an output terminal for connection to an antenna, a common ground connection, a first secondary winding serially interconnected from said common ground connection to said output terminal in a first polarity sense with respect to said common ground connection, a receiver having an input terminal, a second secondary winding serially interconnected from said output terminal to said input terminal of said receiver in a second polarity sense with respect to said common ground connection opposite to said first polarity sense, a transmitter including an output tank circuit inductively coupled with said first and second secondary windings, a shielding element separating said first secondary winding from said second secondary winding whereby the local transmitter and the local receiver may be simultaneously operated on the same radio frequency without the local transmitter signal appearing in the local receiver.

References Cited in the file of this patent

UNITED STATES PATENTS 1,042,205 De Forest ------------ Oct. 22, 1912